(12) United States Patent
Klemen

(10) Patent No.: US 7,341,537 B2
(45) Date of Patent: Mar. 11, 2008

(54) MULTI-SPEED TRANSMISSION

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 269 days.

(21) Appl. No.: 11/137,622

(22) Filed: May 25, 2005

(65) Prior Publication Data
US 2006/0270513 A1 Nov. 30, 2006

(51) Int. Cl.
F16H 3/62 (2006.01)
(52) U.S. Cl. .................................. 475/276
(58) Field of Classification Search ............... 475/276
See application file for complete search history.

(56) References Cited

U.S. PATENT DOCUMENTS

| | | | |
|---|---|---|---|
| 4,070,927 A | 1/1978 | Polak | 475/286 |
| 4,709,594 A | 12/1987 | Maeda | 475/280 |
| 5,106,352 A | 4/1992 | Lepelletier | 475/280 |
| 5,385,064 A | 1/1995 | Reece | 74/331 |
| 5,497,867 A | 3/1996 | Hirsch et al. | 192/48.91 |
| 5,560,461 A | 10/1996 | Loeffler | 192/53.32 |
| 5,599,251 A | 2/1997 | Beim et al. | 575/275 |
| 5,641,045 A | 6/1997 | Ogawa et al. | 192/53.341 |
| 5,651,435 A | 7/1997 | Perosky et al. | 192/219 |
| 5,975,263 A | 11/1999 | Forsyth | 192/53.32 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,354,416 B1 | 3/2002 | Eo | 192/53.341 |
| 6,375,592 B1 | 4/2002 | Takahashi et al. | 475/262 |
| 6,422,969 B1 | 7/2002 | Raghavan et al. | 475/276 |
| 6,425,841 B1 * | 7/2002 | Haka | 475/275 |
| 6,471,615 B1 | 10/2002 | Naraki et al. | 475/262 |
| 6,558,287 B2 | 5/2003 | Hayabuchi et al. | 475/271 |
| 6,623,397 B1 | 9/2003 | Raghavan et al. | 360/96.5 |
| 6,840,885 B2 | 1/2005 | Yi et al. | 475/276 |

FOREIGN PATENT DOCUMENTS

JP 09-126283 5/1997

* cited by examiner

Primary Examiner—Roger Pang
Assistant Examiner—Derek D. Knight

(57) ABSTRACT

A transmission is provided having at least three planetary gearsets, each having respective first, second, and third members, and six selectively engageable torque transmitting devices configured to selectively interconnect selected members of the planetary gearsets for unitary rotation thereby to provide at least six forward speed ratios and at least one reverse speed ratio between an input member and an output member.

15 Claims, 6 Drawing Sheets

| Six Clutch/Seven Speed | | | | |
|---|---|---|---|---|
| Total Ratio Coverage 1-7 | | | 7.36 | |
| | Ratio | Step | Clutches | |
| 1 | 5.744 | | C3 | C7 |
| 2 | 3.579 | 1.60 | C6 | C7 |
| 3 | 2.588 | 1.38 | C3 | C6 |
| 4 | 1.798 | 1.44 | C1 | C6 |
| 5 | 1.302 | 1.30 | C1 | C3 |
| 6 | 1.000 | 1.38 | C1 | C2 |
| 7 | 0.781 | 1.28 | C2 | C3 |
| 8 | 0.686 | 1.14 | C2 | C4 |
| REV | -5.657 | | C3 | C5 |

| Six Clutch/Seven Speed | | | | |
|---|---|---|---|---|
| Total Ratio Coverage 1-7 | | | 5.30 | |
| | Ratio | Step | Clutches | |
| 1 | 4.165 | | C3 | C7 |
| 2 | 2.765 | 1.51 | C6 | C7 |
| 3 | 2.000 | 1.38 | C3 | C6 |
| 4 | 1.566 | 1.28 | C1 | C6 |
| 5 | 1.316 | 1.19 | C1 | C3 |
| 6 | 1.000 | 1.32 | C1 | C2 |
| 7 | 0.785 | 1.27 | C2 | C3 |
| 8 | 0.646 | 1.21 | C2 | C4 |
| REV | -3.658 | | C3 | C5 |

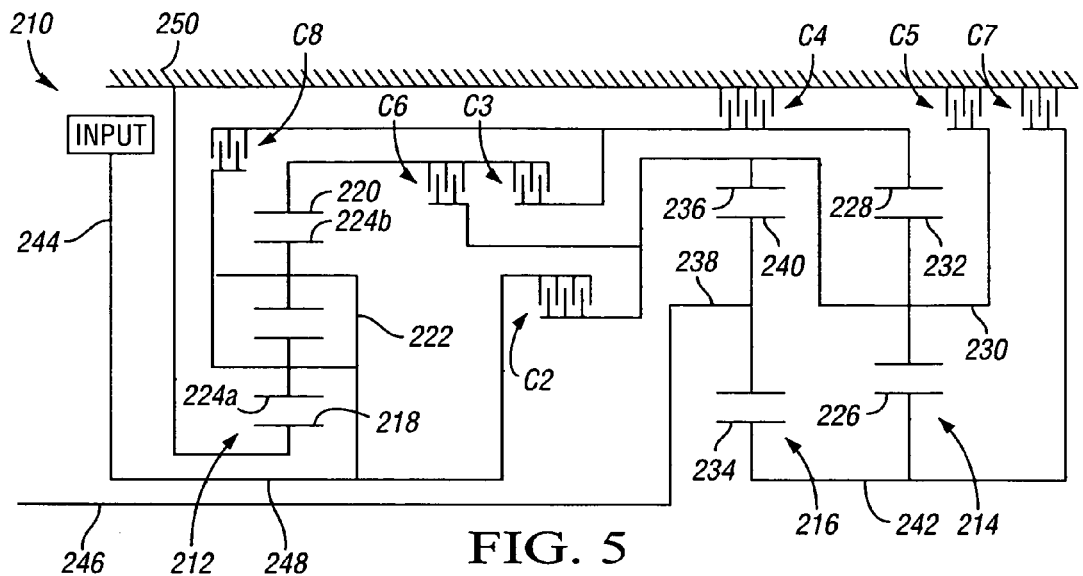
FIG. 5
| Six Clutch/Seven Speed | | | | |
|---|---|---|---|---|
| Total Ratio Coverage 1-7 | | | 4.66 | |
|  | Ratio | Step | Clutches | |
| 1 | 3.711 |  | C3 | C7 |
| 2 | 2.548 | 1.46 | C6 | C7 |
| 3 | 1.924 | 1.32 | C8 | C7 |
| 4 | 1.321 | 1.46 | C2 | C7 |
| 5 | 1.000 | 1.321 | C8 | C2 |
| 6 | 0.796 | 1.26 | C2 | C3 |
| 7 | 0.653 | 1.22 | C2 | C4 |
| REV | -3.625 |  | C3 | C5 |
FIG. 6
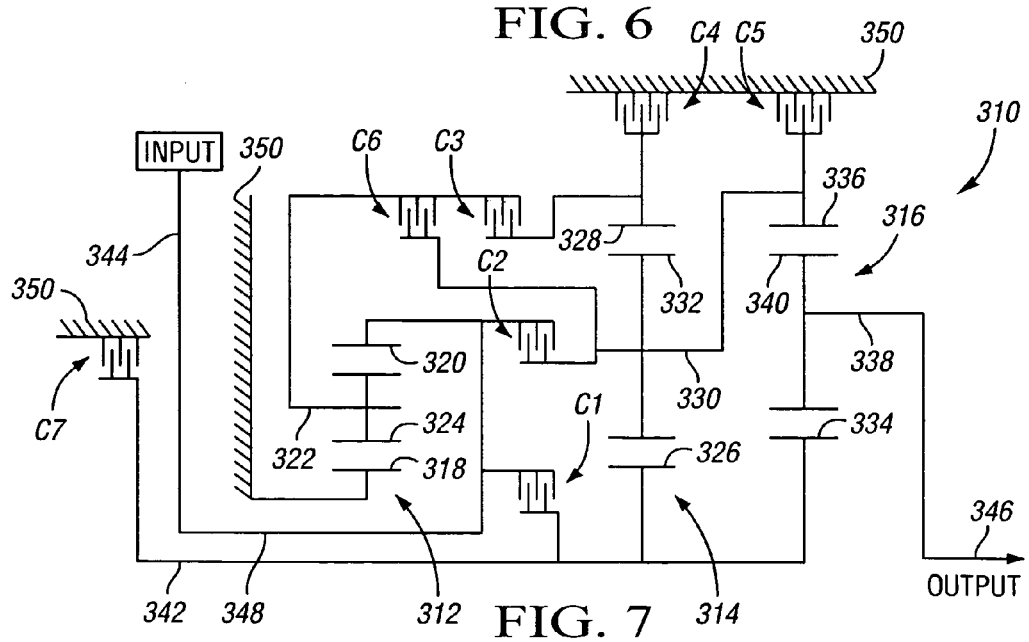
FIG. 7

| Six Clutch/Seven Speed | | | | |
|---|---|---|---|---|
| Total Ratio Coverage 1-7 | | | 4.00 | |
| | Ratio | Step | Clutches | |
| 1 | 3.333 | | C3 | C7 |
| 2 | 2.213 | 1.51 | C6 | C7 |
| 3 | 1.630 | 1.36 | C3 | C6 |
| 4 | 1.398 | 1.17 | C1 | C6 |
| 5 | 1.233 | 1.13 | C1 | C3 |
| 6 | 1.000 | 1.23 | C1 | C2 |
| 7 | 0.832 | 1.20 | C2 | C3 |
| 8 | 0.658 | 1.27 | C2 | C4 |
| REV | -3.129 | | C3 | C5 |

| Range | Ratio | Step | Clutch | |
|---|---|---|---|---|
| 1 | 3.61 | | C1 | C5 |
| 2 | 2.02 | 1.79 | C1 | C4 |
| 3 | 1.70 | 1.19 | C1 | C6 |
| 4 | 1.40 | 1.21 | C1 | C3 |
| 5 | 1.00 | 1.40 | C1 | C2 |
| 6 | 0.733 | 1.36 | C2 | C3 |
| 7 | 0.610 | 1.20 | C2 | C4 |
| Rev | -3.61 | | C3 | C5 |

| | Ratio | Step | Clutches | |
|---|---|---|---|---|
| 1 | 3.931 | | C1 | C5 |
| 2 | 2.889 | 1.36 | C1 | C7 |
| 3 | 2.081 | 1.39 | C1 | C4 |
| 4 | 1.827 | 1.14 | C1 | C6 |
| 5 | 1.461 | 1.25 | C1 | C3 |
| 6 | 1.000 | 1.46 | C1 | C2 |
| 7 | 0.738 | 1.35 | C2 | C3 |
| 8 | 0.631 | 1.17 | C2 | C4 |
| REV | -4.36 | | C3 | C5 |

| Range | Ratio | Step | Clutches | |
|---|---|---|---|---|
| 1 | 3.931 | | C1 | C5 |
| 2 | 2.081 | 1.89 | C1 | C4 |
| 3 | 1.461 | 1.42 | C1 | C3 |
| 4 | 1.000 | 1.46 | C1 | C2 |
| 5 | 0.738 | 1.35 | C2 | C3 |
| 6 | 0.631 | 1.17 | C2 | C4 |
| Rev | -4.356 | | C3 | C5 |

| Ratio Chart | | | | |
|---|---|---|---|---|
| Range | Ratio | Step | Clutches | |
| 1 | 3.931 |  | C1 | C5 |
| 2 | 2.809 | 1.40 | C1 | C7 |
| 3 | 2.081 | 1.35 | C1 | C4 |
| 4 | 1.722 | 1.21 | C1 | C6 |
| 5 | 1.413 | 1.22 | C1 | C3 |
| 6 | 1.000 | 1.41 | C1 | C2 |
| 7 | 0.753 | 1.33 | C2 | C3 |
| 8 | 0.631 | 1.19 | C2 | C4 |
| REV | 3.911 |  | C3 | C5 |

MULTI-SPEED TRANSMISSION

TECHNICAL FIELD

This invention relates to transmissions having planetary gear arrangements.

BACKGROUND OF THE INVENTION

Passenger vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point other than the most efficient point during cruising. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

A transmission includes an input member, an output member, a stationary member, and first, second, and third planetary gearsets. Each of the planetary gearsets has a respective first, second, and third member. The first member of the first planetary gearset is continuously operatively connected to the input member for unitary rotation. The second member of the first planetary gearset is continuously operatively connected to the stationary member. The first member of the second planetary gearset is continuously operatively connected to the first member of the third planetary gearset for unitary rotation. The third member of the second planetary gearset is continuously operatively connected to the second member of the third planetary gearset for unitary rotation. The third member of the third planetary gearset is continuously operatively connected to the output member for unitary rotation.

The transmission also includes first, second, third, fourth, fifth, and sixth torque transmitting devices operative to selectively connect members of the planetary gearsets with the input member, the stationary member, or with other members of the planetary gearsets to provide at least six forward speed ratios.

In an exemplary embodiment, the first torque transmitting device is configured to selectively couple the input member and the first member of the first planetary gearset with the third member of the second planetary gearset and the second member of the third planetary gearset for unitary rotation. The second torque transmitting device is configured to selectively couple the third member of the first planetary gearset with the second member of the second planetary gearset for unitary rotation. The third torque transmitting device is configured to selectively couple the second member of the third planetary gearset and the third member of the second planetary gearset with the stationary member. The fourth torque transmitting device is configured to selectively couple the third member of the first planetary gearset with the third member of the second planetary gearset and the second member of the third planetary gearset for unitary rotation. The fifth torque transmitting device is configured to selectively couple the first member of the first planetary gearset with a member of the second planetary gearset for unitary rotation. The sixth torque transmitting device is configured to selectively couple a member of the second planetary gearset with the stationary member.

The transmission may further include a seventh torque transmitting device configured to selectively couple the second member of the second planetary gearset with the stationary member to provide at least seven forward speed ratios and at least one reverse ratio.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic representation of a third transmission according to the present invention;

FIG. 6 is a ratio chart and truth table depicting a shift logic sequence for use with the transmission of FIG. 5;

FIG. 7 is a schematic representation of a fourth transmission according to the present invention;

DESCRIPTION OF THE PREFERRED EMBODIMENTS

Figures 1, 2:
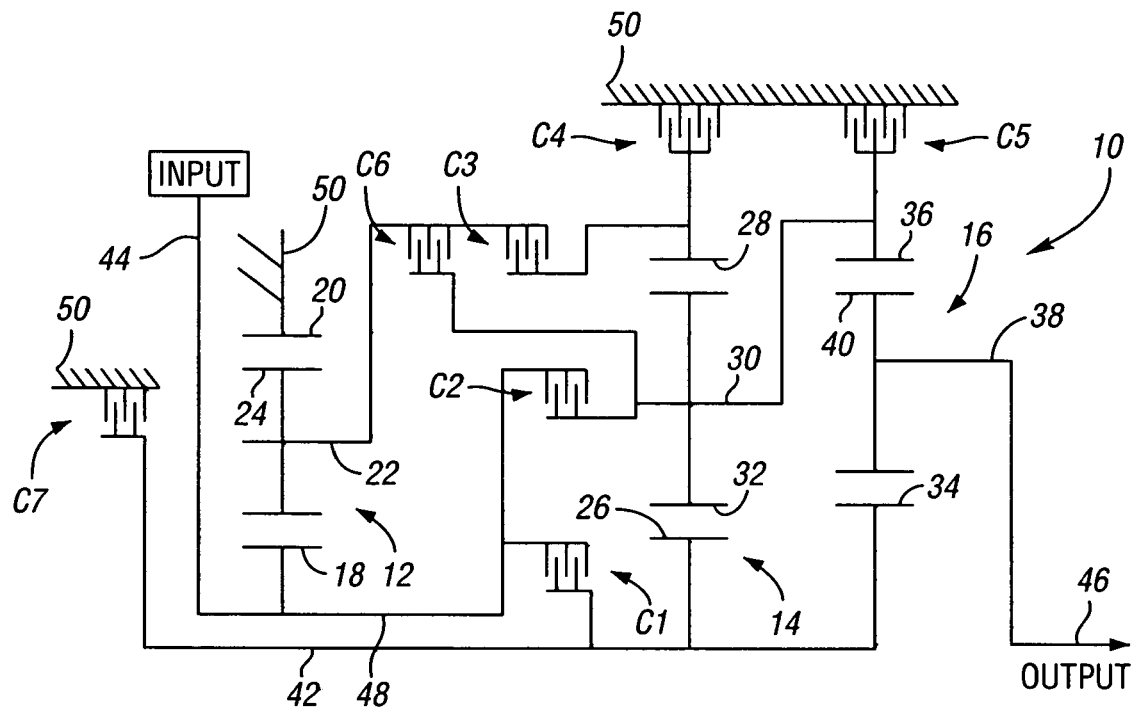
FIG. 1 is a schematic representation of a first transmission according to the present invention.
FIG. 2 is a ratio chart and truth table depicting a shift logic sequence for use with the transmission of FIG. 1.

Referring to FIG. 1, a transmission 10 is schematically depicted. The transmission 10 includes a first planetary gearset 12, a second planetary gearset 14, and a third planetary gearset 16. Each of the first, second, and third planetary gearsets have respective first, second, and third members. More specifically, the first planetary gearset includes a sun gear member 18, a ring gear member 20, and a planet carrier assembly member 22. Planet carrier assembly member 22 rotatably supports a plurality of planet gear members 24 that meshingly engage sun gear member 18 and ring gear member 20. The second planetary gearset 14 includes a sun gear member 26, a ring gear member 28, and a planet carrier assembly member 30. Planet carrier assembly member 30 rotatably supports a plurality of planet gear members 32 that meshingly engage sun gear member 26 and ring gear member 28. The third planetary gearset 16 includes a sun gear member 34, a ring gear member 36, and a planet carrier assembly member 38. Planet carrier assembly member 38 rotatably supports a plurality of planet gear members 40 that meshingly engage sun gear member 34 and ring gear member 36.

Shaft 42 is an interconnecting member that continuously connects sun gear members 26 and 34 for unitary rotation. Input member 44 is connectable to an engine (not shown), either directly or through a torque convertor. Output member 46 is connectable to the final drive system of a vehicle to drive wheels or other tractive device. Interconnecting member 48 continuously interconnects the input member 44 and sun gear member 18 for unitary rotation. Transmission 10 also includes a stationary member such as transmission housing 50.

Ring gear member 20 is continuously grounded to the housing 50 to prevent rotation of ring gear member 20. Planet carrier assembly member 30 is continuously connected to ring gear member 36 for unitary rotation. Output member 46 is continuously connected to planet carrier assembly member 38 for unitary rotation.

The transmission 10 further includes a plurality of selectively engageable torque transmitting devices, or clutches C1-C7. Clutch C1 selectively couples sleeve 48, input member 44, and sun gear member 18 to sun gear member 26 and sun gear member 34 for unitary rotation. Clutch C2 selectively couples sleeve 48, input member 44, and sun gear member 18 to planet carrier assembly member 30 and ring gear member 36 for unitary rotation. Clutch C3 selectively couples planet carrier assembly member 22 with ring gear member 28 for unitary rotation. Clutch C4 is a brake that selectively couples ring gear member 28 to the housing 50. Clutch C5 is a brake that selectively couples ring gear member 36 and planet carrier assembly member 30 to the housing 50. Clutch C6 selectively couples planet carrier assembly member 22 to planet carrier assembly member 30 and ring gear member 36 for unitary rotation. Clutch C7 is a brake that selectively couples sun gear member 26 and sun gear member 34 to the housing 50.

Referring to FIG. 2, a shift logic sequence for clutches C1-C7 is depicted that provides eight forward speed ratios and one reverse speed ratio between the input member 44 and the output member 46. Referring to FIGS. 1 and 2, a first forward speed ratio is achieved when clutches C3 and C7 are engaged. A second forward speed ratio is achieved when clutches C6 and C7 are engaged. A third forward speed ratio is achieved when clutches C3 and C6 are engaged. A fourth forward speed ratio is achieved when clutches C1 and C6 are engaged. A fifth forward speed ratio is achieved when clutches C1 and C3 are engaged. A sixth forward speed ratio is achieved when clutches C1 and C2 are engaged. A seventh forward speed ratio is achieved when clutches C2 and C3 are engaged. An eighth forward speed ratio is achieved when clutches C2 and C4 are engaged. A reverse speed ratio is achieved when clutches C3 and C5 are engaged. It should be noted that the omission of clutch C4 yields a six clutch/seven speed transmission, i.e., speed ratios 1-7.

In the embodiment depicted, ring gear members 20, 28, and 36 each have 81 teeth, sun gear member 18 has 51 teeth, sun gear member 26 has 49 teeth, and sun gear member 34 has 31 teeth.

Figures 3, 4:
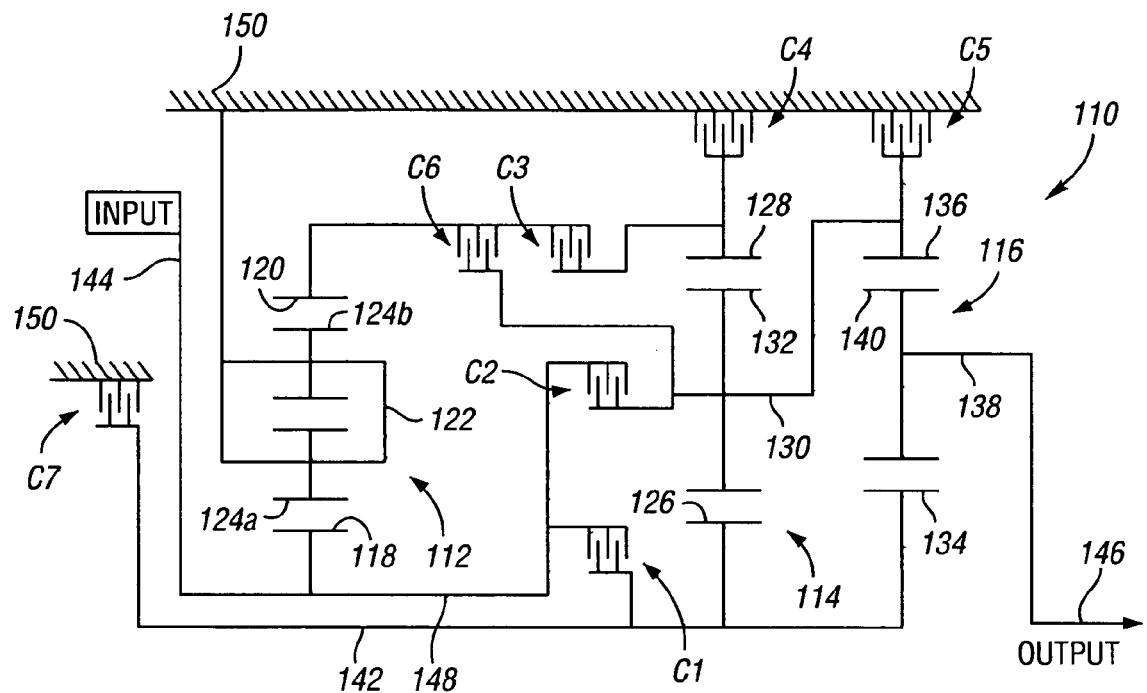
FIG. 3 is a schematic representation of a second transmission according to the present invention.
FIG. 4 is a ratio chart and truth table depicting a shift logic sequence for use with the transmission of FIG. 3.

Referring to FIG. 3, an alternative transmission 110 is schematically depicted. The transmission 110 includes a first planetary gearset 112, a second planetary gearset 114, and a third planetary gearset 116. Each of the first, second, and third planetary gearsets have respective first, second, and third members. More specifically, the first planetary gearset includes a sun gear member 118, a ring gear member 120, and a planet carrier assembly member 122. Planet carrier assembly member 122 is compound and thus rotatably supports a first set of planet gear members 124a that meshingly engage sun gear member 118. Planet carrier assembly member 122 also rotatably supports a second set of planet gear members 124b that meshingly engage the first set of planet gear members 124a and ring gear member 120.

The second planetary gearset 114 includes a sun gear member 126, a ring gear member 128, and a planet carrier assembly member 130. Planet carrier assembly member 130 rotatably supports a plurality of planet gear members 132 that meshingly engage sun gear member 126 and ring gear member 128. The third planetary gearset 116 includes a sun gear member 134, a ring gear member 136, and a planet carrier assembly member 138. Planet carrier assembly member 138 rotatably supports a plurality of planet gear members 140 that meshingly engage sun gear member 134 and ring gear member 136.

Shaft 142 is an interconnecting member that continuously connects sun gear members 126 and 134 for unitary rotation. Interconnecting member 148 continuously interconnects the input member 144 and sun gear member 118 for unitary rotation. Transmission 110 also includes a stationary member such as transmission housing 150.

Planet carrier assembly member 122 is continuously grounded to the housing 150 to prevent rotation of planet carrier assembly member 122. Planet carrier assembly member 130 is continuously connected to ring gear member 136 for unitary rotation. Output member 146 is continuously connected to planet carrier assembly member 138 for unitary rotation.

The transmission 110 further includes a plurality of selectively engageable torque transmitting devices, or clutches C1-C7. Clutch C1 selectively couples sleeve 148, input member 144, and sun gear member 118 to sun gear member 126 and sun gear member 134 for unitary rotation. Clutch C2 selectively couples sleeve 148, input member 144, and sun gear member 118 to planet carrier assembly member 130 and ring gear member 136 for unitary rotation. Clutch C3 selectively couples ring gear member 120 with ring gear member 128 for unitary rotation. Clutch C4 is a brake that selectively couples ring gear member 128 to the housing 150. Clutch C5 is a brake that selectively couples ring gear member 136 and planet carrier assembly member 130 to the housing 150. Clutch C6 selectively couples ring gear member 120 to planet carrier assembly member 130 and ring gear member 136 for unitary rotation. Clutch C7 is a brake that selectively couples sun gear member 126 and sun gear member 134 to the housing 150.

Referring to FIG. 4, a shift logic sequence for clutches C1-C7 is depicted that provides eight forward speed ratios and one reverse speed ratio between the input member 144 and the output member 146. The clutch engagement sequence of FIG. 4 is identical to that of FIG. 2, but different speed ratios between input member 144 and output member 146 are achieved. In the embodiment depicted, ring gear member 120 has 80 teeth, sun gear member has 40 teeth, ring gear members 128 and 136 each have 81 teeth, sun gear member 126 has 41 teeth, and sun gear member 134 has 31 teeth.

Referring to FIG. 5, transmission 210 includes a first planetary gearset 212, a second planetary gearset 214, and a third planetary gearset 216. Each of the first, second, and third planetary gearsets have respective first, second, and third members. More specifically, the first planetary gearset includes a sun gear member 218, a ring gear member 220, and a planet carrier assembly member 222. Planet carrier assembly member 222 is compound and thus rotatably supports a first set of planet gear members 224a that meshingly engage sun gear member 218. Planet carrier assembly member 222 also rotatably supports a second set of planet gear members 224b that meshingly engage the first set of planet gear members 224a and ring gear member 220.

The second planetary gearset 214 includes a sun gear member 226, a ring gear member 228, and a planet carrier assembly member 230. Planet carrier assembly member 230 rotatably supports a plurality of planet gear members 232 that meshingly engage sun gear member 226 and ring gear member 228. The third planetary gearset 216 includes a sun gear member 234, a ring gear member 236, and a planet carrier assembly member 238. Planet carrier assembly member 238 rotatably supports a plurality of planet gear members 240 that meshingly engage sun gear member 234 and ring gear member 236.

Shaft 242 is an interconnecting member that continuously connects sun gear members 226 and 234 for unitary rotation. Interconnecting member 248 continuously interconnects the input member 244 and planet carrier assembly member 222 for unitary rotation. Transmission 210 also includes a stationary member such as transmission housing 250.

Sun gear member 218 is continuously grounded to the housing 250 to prevent rotation of sun gear member 218. Planet carrier assembly member 230 is continuously connected to ring gear member 236 for unitary rotation. Output member 246 is continuously connected to planet carrier assembly member 238 for unitary rotation.

The transmission 210 further includes a plurality of selectively engageable torque transmitting devices, or clutches C2-C8. Clutch C1 as found in the transmissions 10, 110 of FIGS. 1 and 3, respectively, i.e., selectively interconnecting an input member and a member of the first planetary gearset with the sun gear members of the second and third planetary gearsets, is not present in transmission 210. Clutch C2 selectively couples sleeve 248, input member 244, and planet carrier assembly member 222 to planet carrier assembly member 230 and ring gear member 236 for unitary rotation. Clutch C3 selectively couples ring gear member 220 with ring gear member 228 for unitary rotation. Clutch C4 is a brake that selectively couples ring gear member 228 to the housing 250. Clutch C5 is a brake that selectively couples ring gear member 236 and planet carrier assembly member 230 to the housing 250. Clutch C6 selectively couples ring gear member 220 to planet carrier assembly member 230 and ring gear member 236 for unitary rotation. Clutch C7 is a brake that selectively couples sun gear member 226 and sun gear member 234 to the housing 250. Clutch C8 selectively couples planet carrier assembly member 222, member 248, and input member 244 with ring gear member 228 for unitary rotation.

In the embodiment depicted, ring gear members 220, 228, and 236 each have 81 teeth, and sun gear member 218 has 39 teeth, sun gear member 226 has 37 teeth, and sun gear member 234 has 26 teeth. FIG. 6 depicts a preferred shift logic to provide seven forward speed ratios between the input member 244 and the output member 246, and one reverse speed ratio. Referring to FIGS. 5 and 6; a first speed ratio is achieved when clutchs C3 and C7 are engaged; a second speed ratio is achieved when clutches C6 and C7 are engaged; a third speed ratio is achieved when clutches C8 and C7 are engaged; a fourth speed ratio is achieved when clutches C2 and C7 are engaged; a fifth speed ratio is achieved when clutched C8 and C2 are engaged; a sixth speed ratio is achieved when clutches C2 and C3 are engaged; and a seventh speed ratio is achieved when clutches C2 and C4 are engaged. A reverse speed ratio is achieved when clutches C3 and C5 are engaged. Clutch C4 may be omitted, whereby six forward speed ratios are provided.

Referring to FIG. 7, transmission 310 includes a first planetary gearset 312, a second planetary gearset 314, and a third planetary gearset 316. Each of the first, second, and third planetary gearsets have respective first, second, and third members. More specifically, the first planetary gearset includes a sun gear member 318, a ring gear member 320, and a planet carrier assembly member 322. Planet carrier assembly member 322 rotatably supports planet gear members 324 that meshingly engage sun gear member 318 and ring gear member 320.

The second planetary gearset 314 includes a sun gear member 326, a ring gear member 328, and a planet carrier assembly member 330. Planet carrier assembly member 330 rotatably supports a plurality of planet gear members 332 that meshingly engage sun gear member 326 and ring gear member 328. The third planetary gearset 316 includes a sun gear member 334, a ring gear member 336, and a planet carrier assembly member 338. Planet carrier assembly member 338 rotatably supports a plurality of planet gear members 340 that meshingly engage sun gear member 334 and ring gear member 336.

Shaft 342 is an interconnecting member that continuously connects sun gear members 326 and 334 for unitary rotation.

Interconnecting member 348 continuously interconnects the input member 344 and ring gear member 320 for unitary rotation. Transmission 310 also includes a stationary member such as transmission housing 350.

Sun gear member 318 is continuously grounded to the housing 350 to prevent rotation of sun gear member 318. Planet carrier assembly member 330 is continuously connected to ring gear member 336 for unitary rotation. Output member 346 is continuously connected to planet carrier assembly member 338 for unitary rotation.

The transmission 310 further includes a plurality of selectively engageable torque transmitting devices, or clutches C1-C7. Clutch C1 selectively couples sleeve 348, input member 344, and ring gear member 320 to shaft 342, sun gear member 326 and sun gear member 334 for unitary rotation. Clutch C2 selectively couples sleeve 348, input member 344, and ring gear member 320 to planet carrier assembly member 330 and ring gear member 336 for unitary rotation. Clutch C3 selectively couples planet carrier assembly member 322 with ring gear member 328 for unitary rotation. Clutch C4 is a brake that selectively couples ring gear member 328 to the housing 350. Clutch C5 is a brake that selectively couples ring gear member 336 and planet carrier assembly member 330 to the housing 350. Clutch C6 selectively couples planet carrier assembly member 322 to planet carrier assembly member 330 and ring gear member 336 for unitary rotation. Clutch C7 is a brake that selectively couples shaft 342, sun gear member 326 and sun gear member 334 to the housing 350.

Figures 8, 9, 10:
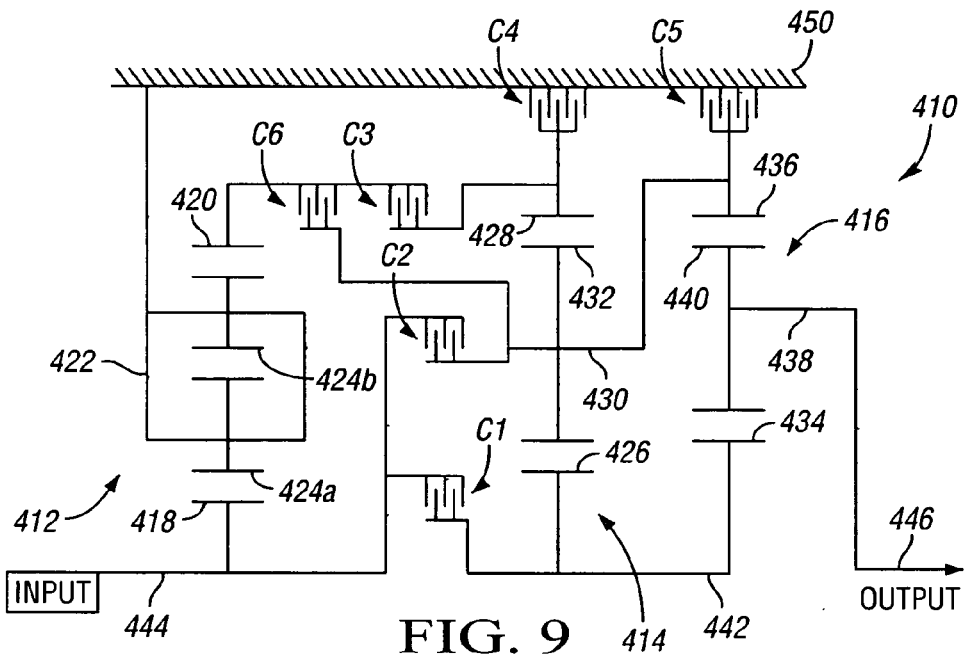
FIG. 8 is a ratio chart and truth table depicting a shift logic sequence for use with the transmission of FIG. 7.
FIG. 9 is a schematic representation of a fifth transmission according to the present invention.
FIG. 10 is a ratio chart and truth table depicting a shift logic sequence for use with the transmission of FIG. 9.

In the embodiment depicted, ring -gear members 320, 328, and 336 each have 81 teeth, and sun gear member 318 has 51 teeth, sun gear member 326 has 41 teeth, and sun gear member 334 has 29 teeth. FIG. 8 depicts a shift logic sequence to provide eight forward speed ratios between the input member 344 and the output member 346, and one reverse speed ratio. The clutch engagement for the shift logic of FIG. 8 is identical to the clutch engagement shown in FIG. 2.

Referring to FIG. 9, transmission 410 includes a first planetary gearset 412, a second planetary gearset 414, and a third planetary gearset 416. Each of the first, second, and third planetary gearsets have respective first, second, and third members. More specifically, the first planetary gearset includes a sun gear member 418, a ring gear member 420, and a planet carrier assembly member 422. Planet carrier assembly member 422 is compound and thus rotatably supports a first set of planet gear members 424a and a second set of planet gear members 424b. The first set of planet gear members 424a meshingly engage sun gear member 418, and the second set of planet gear members 424b meshingly engage the first set of planet gear members 424a and ring gear member 420.

The second planetary gearset 414 includes a sun gear member 426, a ring gear member 428, and a planet carrier assembly member 430. Planet carrier assembly member 430 rotatably supports a plurality of planet gear members 432 that meshingly engage sun gear member 426 and ring gear member 428. The third planetary gearset 416 includes a sun gear member 434, a ring gear member 436, and a planet carrier assembly member 438. Planet carrier assembly member 438 rotatably supports a plurality of planet gear members 440 that meshingly engage sun gear member 434 and ring gear member 436.

Shaft 442 is an interconnecting member that continuously connects sun gear members 426 and 434 for unitary rotation. Input member 444 is continuously connected to sun gear member 418 for unitary rotation. Transmission 410 also includes a stationary member such as transmission housing 450.

Planet carrier assembly member 422 is continuously grounded to the housing 450. Planet carrier assembly member 430 is continuously connected to ring gear member 436 for unitary rotation. Output member 446 is continuously connected to planet carrier assembly member 438 for unitary rotation.

The transmission 410 further includes a plurality of selectively engageable torque transmitting devices, or clutches C1-C6. Clutch C1 selectively couples input member 444 and sun gear member 418 to shaft 442, sun gear member 426 and sun gear member 434 for unitary rotation. Clutch C2 selectively couples input member 444 and sun gear member 418 to planet carrier assembly member 430 and ring gear member 436 for unitary rotation. Clutch C3 selectively couples ring gear member 420 with ring gear member 428 for unitary rotation. Clutch C4 is a brake that selectively couples ring gear member 428 to the housing 450. Clutch C5 is a brake that selectively couples ring gear member 436 and planet carrier assembly member 430 to the housing 450. Clutch C6 selectively couples ring gear member 420 to planet carrier assembly member 430 and ring gear member 436 for unitary rotation.

In the embodiment depicted, ring gear members 420, 428, and 436 each have 81 teeth, and sun gear member 418 has 35 teeth, sun gear member 426 has 35 teeth, and sun gear member 434 has 31 teeth. FIG. 10 depicts a shift logic sequence to provide seven forward speed ratios between the input member 444 and the output member 446, and one reverse speed ratio. A first speed ratio is achieved when clutches C1 and C5 are engaged; a second speed ratio is achieved when clutches C1 and C4 are engaged; a third speed ratio is achieved when clutches C1 and C6 are engaged; a fourth speed ratio is achieved when clutches C1 and C3 are engaged; a fifth speed ratio is achieved when clutches C1 and C2 are engaged; a sixth speed ratio is achieved when clutches C2 and C3 are engaged; and a seventh speed ratio is achieved when clutches C2 and C4 are engaged. A reverse speed ratio is achieved when clutches C3 and C5 are engaged.

Figures 11, 12, 13:
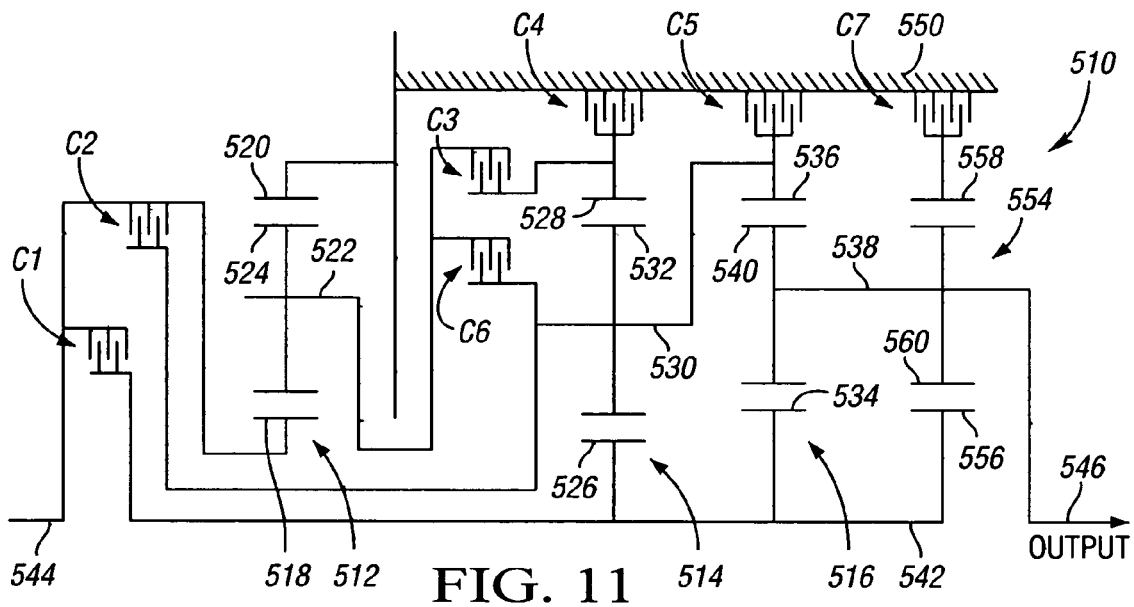
FIG. 11 is a schematic representation of a sixth transmission according to the present invention.
FIG. 12 is a ratio chart and truth table depicting a shift logic sequence for use with the transmission of FIG. 11.
FIG. 13 is a ratio chart and truth table depicting another shift logic sequence for use with the transmission of FIG. 11.

Referring to FIG. 11, transmission 510 includes a first planetary gearset 512, a second planetary gearset 514, a third planetary gearset 516, and a fourth planetary gearset 554. Each of the first, second, third, and fourth planetary gearsets have respective first, second, and third members. More specifically, the first planetary gearset includes a sun gear member 518, a ring gear member 520, and a planet carrier assembly member 522. Planet carrier assembly member 522 rotatably supports a plurality of planet gear members 524 that meshingly engage sun gear member 518 and ring gear member 520.

The second planetary gearset 514 includes a sun gear member 526, a ring gear member 528, and a planet carrier assembly member 530. Planet carrier assembly member 530 rotatably supports a plurality of planet gear members 532 that meshingly engage sun gear member 526 and ring gear member 528. The third planetary gearset 516 includes a sun gear member 534, a ring gear member 536, and a planet carrier assembly member 538. Planet carrier assembly member 538 rotatably supports a plurality of planet gear members 540 that meshingly engage sun gear member 534 and ring gear member 536.

The fourth planetary gearset 554 includes a sun gear member 556, a ring gear member 558, and planet carrier assembly member 538. Planet carrier assembly member 538 is common to the third and fourth planetary gearsets 516, 554, and thus the planet carrier assemblies of the third and fourth planetary gearsets 516, 554 are continuously connected for unitary rotation. Alternatively, and within the scope of the claimed invention, the third and fourth planetary gearsets may employ separate, interconnected planet carrier assembly members. Planet carrier assembly 538 rotatably supports a plurality of planet gear members 560 that meshingly engage sun gear member 556 and ring gear member 558.

Shaft 542 is an interconnecting member that continuously connects sun gear members 526, 534, and 556 for unitary rotation. Input member 544 is continuously connected to sun gear member 518 for unitary rotation. Transmission 510 also includes a stationary member such as transmission housing 550.

Ring gear member 520 is continuously grounded to the housing 550. Planet carrier assembly member 530 is continuously connected to ring gear member 536 for unitary rotation. Output member 546 is continuously connected to planet carrier assembly member 538 for unitary rotation.

The transmission 510 further includes a plurality of selectively engageable torque transmitting devices, or clutches C1-C7. Clutch C1 selectively couples input member 544 and sun gear member 518 to shaft 542, sun gear member 526, sun gear member 534, and sun gear member 556 for unitary rotation. Clutch C2 selectively couples input member 544 and sun gear member 518 to planet carrier assembly member 530 and ring gear member 536 for unitary rotation. Clutch C3 selectively couples planet carrier assembly member 522 with ring gear member 528 for unitary rotation. Clutch C4 is a brake that selectively couples ring gear member 528 to the housing 550. Clutch C5 is a brake that selectively couples ring gear member 536 and planet carrier assembly member 530 to the housing 550. Clutch C6 selectively couples planet carrier assembly member 522 to planet carrier assembly member 530 and ring gear member 536 for unitary rotation. Clutch C7 is a brake that selectively couples ring gear member 558 to the housing 550.

In the embodiment depicted, ring gear members 520, 528, 536, and 558 each have 85 teeth, and sun gear member 518 has 55 teeth, sun gear member 526 has 37 teeth, sun gear member 534 has 29 teeth, and sun gear member 556 has 45 teeth. FIG. 12 depicts a shift logic sequence to provide eight forward speed ratios between the input member 544 and the output member 546, and one reverse speed ratio. A first speed ratio is achieved when clutches C1 and C5 are engaged; a second speed ratio is achieved when clutches C1 and C7 are engaged; a third speed ratio is achieved when clutches C1 and C4 are engaged; a fourth speed ratio is achieved when clutches C1 and C6 are engaged; a fifth speed ratio is achieved when clutches C1 and C3 are engaged; a sixth speed ratio is achieved when clutches C1 and C2 are engaged; a seventh speed ratio is achieved when clutches C2 and C3 are engaged; and an eighth speed ratio is achieved when clutches C2 and C4 are engaged. A reverse speed ratio is achieved when clutches C3 and C5 are engaged.

FIG. 13 depicts a shift logic sequence for use with the transmission 510 of FIG. 11 that does not employ clutches C6 and C7. Referring to FIGS. 11 and 13, a first speed ratio is achieved when clutches C1 and C5 are engaged; a second speed ratio is achieved when clutches C1 and C4 are engaged; a third speed ratio is achieved when clutches C1 and C3 are engaged; a fourth speed ratio is achieved when clutches C1 and C2 are engaged; a fifth speed ratio is achieved when clutches C2 and C3 are engaged; and a sixth speed ratio is achieved when clutches C2 and C4 are engaged. A reverse speed ratio is achieved when clutches C3 and C5 are engaged.

Figures 14, 15:
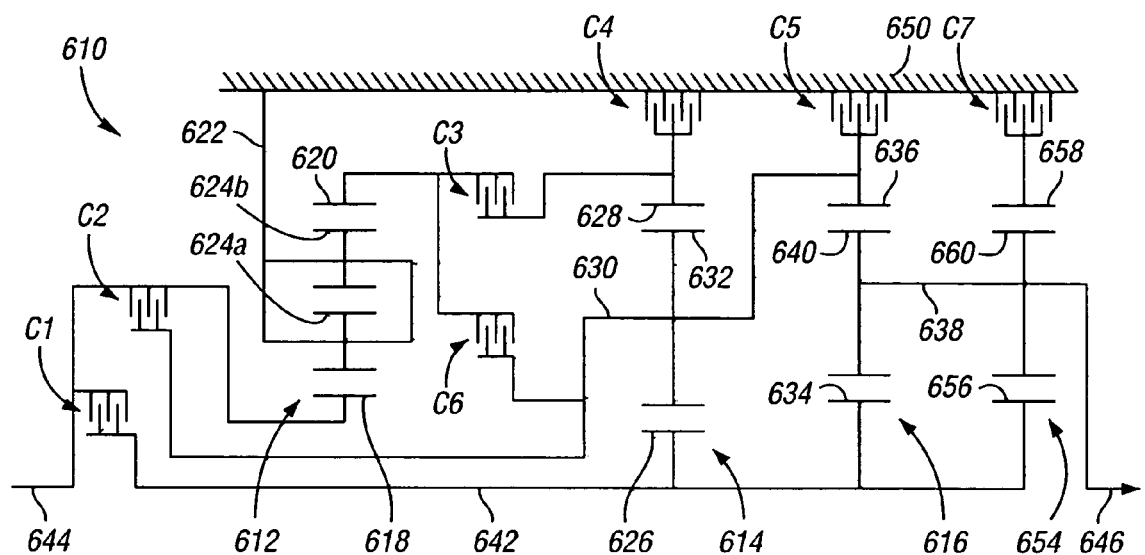
FIG. 14 is a schematic representation of a seventh transmission according to the present invention.
FIG. 15 is a ratio chart and truth table depicting a shift logic sequence for use with the transmission of FIG. 14.

Referring to FIG. 14, transmission 610 includes a first planetary gearset 612, a second planetary gearset 614, a third planetary gearset 616, and a fourth planetary gearset 654. Each of the first, second, third, and fourth planetary gearsets have respective first, second, and third members. More specifically, the first planetary gearset includes a sun gear member 618, a ring gear member 620, and a planet carrier assembly member 622. Planet carrier assembly member 622 rotatably supports a first set of planet gear members 624a that meshingly engage sun gear member 618; planet carrier assembly member 622 also rotatably supports a second set of planet gear members 624b that meshingly engage the first set of planet gear members 624a and ring gear member 620.

The second planetary gearset 614 includes a sun gear member 626, a ring gear member 628, and a planet carrier assembly member 630. Planet carrier assembly member 630 rotatably supports a plurality of planet gear members 632 that meshingly engage sun gear member 626 and ring gear member 628. The third planetary gearset 616 includes a sun gear member 634, a ring gear member 636, and a planet carrier assembly member 638. Planet carrier assembly member 638 rotatably supports a plurality of planet gear members 640 that meshingly engage sun gear member 634 and ring gear member 636.

The fourth planetary gearset 654 includes a sun gear member 656, a ring gear member 658, and planet carrier assembly member 638. Planet carrier assembly member 638 rotatably supports a plurality of planet gear members 660 that meshingly engage sun gear member 656 and ring gear member 658.

Shaft 642 is an interconnecting member that continuously connects sun gear members 626, 634, and 656 for unitary rotation. Input member 644 is continuously connected to sun gear member 618 for unitary rotation. Transmission 610 also includes a stationary member such as transmission housing 650.

Planet carrier assembly member 622 is continuously grounded to the housing 650. Planet carrier assembly member 630 is continuously connected to ring gear member 636 for unitary rotation. Output member 646 is continuously connected to planet carrier assembly member 638 for unitary rotation.

The transmission 610 further includes a plurality of selectively engageable torque transmitting devices, or clutches C1-C7. Clutch C1 selectively couples input member 644 and sun gear member 618 to shaft 642, sun gear member 626, sun gear member 634, and sun gear member 656 for unitary rotation. Clutch C2 selectively couples input member 644 and sun gear member 618 to planet carrier assembly member 630 and ring gear member 636 for unitary rotation. Clutch C3 selectively couples ring gear 620 with ring gear member 628 for unitary rotation. Clutch C4 is a brake that selectively couples ring gear member 628 to the housing 650. Clutch C5 is a brake that selectively couples ring gear member 636 and planet carrier assembly member 630 to the housing 650. Clutch C6 selectively couples ring gear member 620 to planet carrier assembly member 630 and ring gear member 636 for unitary rotation. Clutch C7 is a brake that selectively couples ring gear member 658 to the housing 650.

In the embodiment depicted, ring gear members 620 has 80 teeth and ring gear members 628, 636, and 658 each have 85 teeth; sun gear member 618 has 35 teeth, sun gear member 626 has 24 teeth, sun gear member 634 has 29 teeth, and sun gear member 656 has 47 teeth. FIG. 15 schematically depicts a shift logic sequence for use with the transmission 610 of FIG. 14 to achieve eight forward speed ratios and one reverse speed ratio between the input member 644 and the output member 646. The clutch engagement sequence of FIG. 14 is identical to the clutch engagement sequence of FIG. 12.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member; an output member; a stationary member;
first, second, and third planetary gearsets each having respective first, second, and third members;
said first member of said first planetary gearset being continuously operatively connected to said input member for unitary rotation;
said second member of said first planetary gearset being continuously operatively connected to said stationary member;
said first member of said second planetary gearset being continuously operatively connected to said first member of said third planetary gearset for unitary rotation;
said third member of said second planetary gearset being continuously operatively connected to said second member of said third planetary gearset for unitary rotation;
said third member of said third planetary gearset being continuously operatively connected to said output member for unitary rotation; and
first, second, third, fourth, fifth, and sixth torque transmitting devices operative to selectively connect members of said planetary gearsets with said input member, said stationary member, or with other members of said planetary gearsets to provide at least six forward speed ratios;
wherein said first torque transmitting device is configured to selectively couple said input member and said first member of said first planetary gearset with said third member of said second planetary gearset and said second member of said third planetary gearset for unitary rotation;
wherein said second torque transmitting device is configured to selectively couple said third member of said first planetary gearset with said second member of said second planetary gearset for unitary rotation;
wherein said third torque transmitting device is configured to selectively couple said second member of said third planetary gearset and said third member of said second planetary gearset with said stationary member;
wherein said fourth torque transmitting device is configured to selectively couple said third member of said first planetary gearset with said third member of said second planetary gearset and said second member of said third planetary gearset for unitary rotation;
wherein said fifth torque transmitting device is configured to selectively couple said first member of said first planetary gearset with a member of said second planetary gearset for unitary rotation; and
wherein said sixth torque transmitting device is configured to selectively couple a member of said second planetary gearset with said stationary member.

2. The transmission of claim 1, wherein said fifth torque transmitting device is configured to selectively couple said first member of said first planetary gearset and said input member with said first member of said second planetary gearset and said first member of said third planetary gearset for unitary rotation; and
wherein said sixth torque transmitting device is configured to selectively couple said first member of said second planetary gearset and said first member of said third planetary gearset with said stationary member.

3. The transmission of claim 2, further comprising a seventh torque transmitting device configured to selectively couple said second member of said second planetary gearset with said stationary member.

4. The transmission of claim 1, wherein said fifth torque transmitting device is configured to selectively couple said first member of said first planetary gearset and said input member with said first member of said second planetary gearset and said first member of said third planetary gearset for unitary rotation; and wherein said sixth torque transmitting device is configured to selectively couple said second member of said second planetary gearset with said stationary member.

5. The transmission of claim 1, wherein said fifth torque transmitting device is configured to selectively couple said first member of said first planetary gearset and said input member with said second member of said second planetary gearset for unitary rotation; and
wherein said sixth torque transmitting device is configured to selectively couple said first member of said second planetary gearset and said first member of said third planetary gearset with said stationary member.

6. The transmission of claim 5, further comprising a seventh torque transmitting device configured to selectively couple said second member of said second planetary gearset with said stationary member.

7. The transmission of claim 1, further comprising a fourth planetary gearset having respective first, second, and third members;
said first member of said fourth planetary gearset being continuously operatively connected to said first member of said second planetary gearset and said first member of said third planetary gearset for unitary rotation;
said third member of said fourth planetary gearset being continuously operatively connected to said third member of said third planetary gearset and said output member for unitary rotation; and
wherein said fifth torque transmitting device is configured to selectively couple said first member of said second planetary gearset, said first member of said third planetary gearset, and said first member of said fourth planetary gearset with said first member of said first planetary gearset and said input member for unitary rotation;
wherein said sixth torque transmitting device is configured to selectively couple said second member of said second planetary gearset to said stationary member; and
wherein the transmission further includes a seventh torque transmitting device configured to selectively couple said second member of said fourth planetary gearset with said stationary member.

8. A transmission comprising:
an input member; an output member; a stationary member;

a first planetary gearset having a plurality of planetary members including a first sun gear member, a first ring gear member, and a first planet carrier assembly;

a second planetary gearset having a second sun gear member, a second ring gear member, and a second planet carrier assembly;

a third planetary gearset having a third sun gear member, a third ring gear member, and a third planet carrier assembly;

said second sun gear member and said third sun gear member being continuously operatively connected for unitary rotation;

said second planet carrier assembly being continuously operatively connected to said third ring gear member for unitary rotation;

said output member being continuously operatively connected to said third planet carrier assembly for unitary rotation;

said input member being continuously operatively connected to a first of said planetary members for unitary rotation;

a second of said planetary members being continuously grounded to said stationary member;

a first torque transmitting device being configured to selectively couple said input member and said first of said planetary members with said second planet carrier assembly and said third ring gear member for unitary rotation;

a second torque transmitting device being configured to selectively couple a third of said planetary members and said second ring gear member for unitary rotation;

a third torque transmitting device being configured to selectively couple said second planet carrier assembly and said third ring gear member with said stationary member;

a fourth torque transmitting device being configured to selectively couple said third of said planetary members with said second planet carrier assembly and said third ring gear member for unitary rotation;

a fifth torque transmitting device configured to selectively couple said first of said planetary members with a member of said second planetary gearset for unitary rotation; and a sixth torque transmitting device configured to selectively couple a member of said second planetary gearset with said stationary member.

9. The transmission of claim 8, wherein said fifth torque transmitting device is configured to selectively couple said first of said planetary members and said input member with said second sun gear member and said third sun gear member for unitary rotation; and wherein said sixth torque transmitting device is configured to selectively couple said second sun gear member and said third sun gear member with said stationary member.

10. The transmission of claim 9, further comprising a seventh torque transmitting device configured to selectively couple said second ring gear member with said stationary member.

11. The transmission of claim 8, wherein said fifth torque transmitting device is configured to selectively couple said first of said planetary members and said input member with said second sun gear member and said third sun gear member for unitary rotation; and wherein said sixth torque transmitting device is configured to selectively couple said second ring gear member with said stationary member.

12. The transmission of claim 8, wherein said fifth torque transmitting device is configured to selectively couple said first of said planetary members and said input member with said second ring gear member for unitary rotation; and wherein said sixth torque transmitting device is configured to selectively couple said second and third sun gear members with said stationary member.

13. The transmission of claim 12, further comprising a seventh torque transmitting device configured to selectively couple said second ring gear member with said stationary member.

14. The transmission of claim 8, further comprising a fourth planetary gearset having a fourth sun gear member, a fourth ring gear member, and a fourth planet carrier assembly;

said fourth sun gear member being continuously operatively connected to said second and third sun gear members for unitary rotation;

said fourth planet carrier assembly being continuously operatively connected to said third planet carrier assembly and said output member for unitary rotation;

wherein said fifth torque transmitting device is configured to selectively couple said first of said planetary members and said input member with said second, third, and fourth sun gear members for unitary rotation;

wherein said sixth torque transmitting device is configured to selectively couple said second ring gear member to said stationary member; and wherein the transmission further includes a seventh torque transmitting device configured to selectively couple said fourth ring gear member with said stationary member.

15. A transmission comprising:

an input member; an output member; a stationary member;

first, second, and third planetary gearsets each having respective first, second, and third members;

said first member of said first planetary gearset being continuously operatively connected to said input member for unitary rotation;

said second member of said first planetary gearset being continuously operatively connected to said stationary member;

said first member of said second planetary gearset being continuously operatively connected to said first member of said third planetary gearset for unitary rotation;

said third member of said second planetary gearset being continuously operatively connected to said second member of said third planetary gearset for unitary rotation;

said third member of said third planetary gearset being continuously operatively connected to said output member for unitary rotation;

a first torque transmitting device configured to selectively couple said input member and said first member of said first planetary gearset with said third member of said second planetary gearset and said second member of said third planetary gearset for unitary rotation;

a second torque transmitting device configured to selectively couple said third member of said first planetary gearset with said second member of said second planetary gearset for unitary rotation;

a third torque transmitting device configured to selectively couple said second member of said third planetary gearset and said third member of said second planetary gearset with said stationary member;

a fourth torque transmitting device configured to selectively couple said third member of said first planetary gearset with said third member of said second planetary gearset and said second member of said third planetary gearset for unitary rotation;

a fifth torque transmitting device configured to selectively couple said first member of said first planetary gearset and said input member with said first member of said second planetary gearset and said first member of said third planetary gearset for unitary rotation;

a sixth torque transmitting device configured to selectively couple said first member of said second planetary gearset and said first member of said third planetary gearset with said stationary member; and a seventh torque transmitting device configured to selectively couple said second member of said second planetary gearset with said stationary member.

* * * * *